United States Patent
Cha (10) Patent No.: US 12,276,566 B2
(45) Date of Patent: Apr. 15, 2025

(54) EQUIPMENT MALFUNCTION DIAGNOSIS APPARATUS USING SOUND SPECTROGRAM IMAGE, AND METHOD THEREFOR

(71) Applicant: WI.PLAT CO., LTD., Daejeon (KR)

(72) Inventor: Sang Hoon Cha, Sejong-si (KR)

(73) Assignee: WI.PLAT CO., LTD., Daejeon (KR)

( * ) Notice: Subject to any disclaimer, the term of this patent is extended or adjusted under 35 U.S.C. 154(b) by 0 days.

(21) Appl. No.: 18/696,749

(22) PCT Filed: Aug. 16, 2022

(86) PCT No.: PCT/KR2022/012205
§ 371 (c)(1),
(2) Date: Apr. 30, 2024

(87) PCT Pub. No.: WO2023/058888
PCT Pub. Date: Apr. 13, 2023

(65) Prior Publication Data
US 2024/0337561 A1    Oct. 10, 2024

(30) Foreign Application Priority Data
Oct. 6, 2021  (KR) .................. 10-2021-0132625

(51) Int. Cl.
*G06F 11/07*    (2006.01)
*G01M 13/00*    (2019.01)
(Continued)

(52) U.S. Cl.
CPC .......... *G01M 13/00* (2013.01); *G01M 13/028* (2013.01); *G01M 13/045* (2013.01); *G06F 11/0736* (2013.01); *G06F 11/079* (2013.01)

(58) Field of Classification Search
CPC .. G01M 13/00; G01M 13/028; G01M 13/045; G06F 11/0736; G06F 11/079
See application file for complete search history.

(56) References Cited

U.S. PATENT DOCUMENTS

| 2005/0096873 A1* | 5/2005 | Klein ................. G05B 23/0275 |
| | | 702/184 |
| 2013/0046714 A1* | 2/2013 | Harris ..................... G01H 1/00 |
| | | 706/45 |

(Continued)

FOREIGN PATENT DOCUMENTS

| EP | 2208981 A1 * | 7/2010 | .......... G01M 13/045 |
| KR | 10-2015-0058928 A | 5/2015 | |

(Continued)

OTHER PUBLICATIONS

G. Hong and D. Suh, "Supervised-Learning-Based Intelligent Fault Diagnosis for Mechanical Equipment," in IEEE Access, vol. 9, pp. 116147-116162, Aug. 11, 2021 (Year: 2021).*

(Continued)

*Primary Examiner* — Matthew M Kim
*Assistant Examiner* — Indranil Chowdhury
(74) *Attorney, Agent, or Firm* — Sughrue Mion, PLLC (57) ABSTRACT

Disclosed are an equipment malfunction diagnosis apparatus using a sound spectrogram image, and a method therefor. In other words, the present invention collects sound data through a sensor unit provided at one side of equipment, converts the collected sound data into a spectrogram image, and determines malfunction of the equipment and classifies a cause of the malfunction by performing machine learning using the spectrogram image as an input value, thereby quickly and accurately identifying the cause of the malfunction when it is identified that there is the malfunction in the equipment, and providing a counterplan in response thereto.

7 Claims, 3 Drawing Sheets

(51) Int. Cl.
  *G01M 13/028*  (2019.01)
  *G01M 13/045*  (2019.01)

(56) References Cited

U.S. PATENT DOCUMENTS

| | | | | |
|---|---|---|---|---|
| 2014/0074435 | A1* | 3/2014 | Cohn | H04R 29/00 |
| | | | | 702/184 |
| 2017/0108407 | A1* | 4/2017 | Takada | G01M 13/028 |
| 2017/0277995 | A1* | 9/2017 | Giering | G01H 1/003 |
| 2021/0209871 | A1* | 7/2021 | Lee | G07C 5/0808 |
| 2021/0256991 | A1* | 8/2021 | Jun | G10L 25/30 |
| 2021/0286995 | A1* | 9/2021 | Zhu | G01M 13/045 |
| 2021/0304786 | A1* | 9/2021 | Fujii | G10L 25/51 |
| 2021/0370904 | A1* | 12/2021 | Seo | G06N 3/045 |
| 2022/0011271 | A1* | 1/2022 | Izumi | G01H 3/06 |
| 2023/0012186 | A1* | 1/2023 | Siegel | G07C 5/0833 |
| 2023/0080002 | A1* | 3/2023 | Angilella | B60G 7/005 |
| | | | | 73/117.03 |
| 2023/0206942 | A1* | 6/2023 | Schneider | G01M 15/04 |
| | | | | 704/200 |
| 2023/0366729 | A1* | 11/2023 | Shimura | G06N 3/0455 |
| 2023/0377382 | A1* | 11/2023 | Bunazawa | G05B 23/024 |
| 2023/0412997 | A1* | 12/2023 | Bouvigne | H04N 21/4425 |
| 2024/0344921 | A1* | 10/2024 | Mawatari | G01H 3/06 |

FOREIGN PATENT DOCUMENTS

| | | | |
|---|---|---|---|
| KR | 10-2019-0098784 A | | 8/2019 |
| KR | 10-2019-0114221 A | | 10/2019 |
| KR | 10-2020-0031463 A | | 3/2020 |
| KR | 10-2021-0077389 A | | 6/2021 |
| KR | 10-2380541 B1 | | 4/2022 |
| WO | WO-2019235035 A1 * | 12/2019 | |
| WO | WO-2023096185 A1 * | 6/2023 | |
| WO | WO-2023203304 A1 * | 10/2023 | G01H 1/003 |

OTHER PUBLICATIONS

International Search Report for PCT/KR2022/012205 dated Nov. 29, 2022.
Written Decision on Registration for the counterpart Korean Application No. 10-2021-013625 dated Feb. 16, 2022.
Request for submission of opinion for the counterpart Korean Application No. 10-2021-013625 dated Nov. 15, 2021.

* cited by examiner

EQUIPMENT MALFUNCTION DIAGNOSIS APPARATUS USING SOUND SPECTROGRAM IMAGE, AND METHOD THEREFOR

CROSS REFERENCE TO RELATED APPLICATIONS

This application is a National Stage of International Application No. PCT/KR2022/012205 filed Aug. 16, 2022, claiming priority based on Korean Patent Application No. 10-2021-0132625 filed Oct. 6, 2021, the entire disclosures of which are incorporated herein by reference.

TECHNICAL FIELD

The present invention relates to an apparatus and method for diagnosing an equipment failure using a sound spectrogram image, and more particularly, to an apparatus and method for diagnosing an equipment failure using a sound spectrogram image in which sound data is collected through a sensor unit provided at one side of equipment and converted into a spectrogram image, and machine learning is performed using the converted spectrogram image as an input value to determine whether a failure occurs in the equipment and classify the cause of the failure.

BACKGROUND ART

Failure diagnosis is a test for diagnosing whether a failure occurs in equipment.

For failure diagnosis, heavy examination equipment is disposed at a site, and then a process of determining whether a failure occurs in equipment in which a failure appears to occur is performed through the disposed examination equipment. However, there is inefficiency in the mobility of such examination equipment and operation for diagnosing an equipment failure.

DISCLOSURE

Technical Problem

The present invention is directed to providing an apparatus and method for diagnosing an equipment failure using a sound spectrogram image in which sound data is collected through a sensor unit provided at one side of equipment and converted into a spectrogram image, and machine learning is performed using the converted spectrogram image as an input value to determine whether a failure occurs in the equipment and classify the cause of the failure.

Technical Solution

One aspect of the present invention provides an apparatus for diagnosing an equipment failure using a sound spectrogram image, the apparatus including a sensor unit configured to collect sound data and collection position information of the sound data from one side of equipment and a controller configured to convert the collected sound data into a spectrogram image, perform machine learning on the basis of the converted spectrogram image, a type of equipment, and the collected collection position information of the sound data, and determine whether a failure occurs in the equipment related to the collected sound data on the basis of a machine learning result.

The controller may perform machine learning using the converted spectrogram image, the type of equipment, and the collected collection position information of the sound data as input values of a preset failure diagnosis and failure cause determination model and determine whether a failure occurs in the equipment related to the collected sound data on the basis of a machine learning result.

When it is determined that a failure occurs in the equipment related to the collected sound data, the controller may classify a cause of the failure, search for a countermeasure for the classified cause of the equipment failure among countermeasures prestored in a storage unit for causes of equipment failures, and perform control to display information representing that the failure occurs in the equipment corresponding to the collected sound data, the cause of the failure of the equipment, information on an estimated failure position among components of the equipment, and a countermeasure for the cause of the failure of the equipment through a display unit.

The controller may generate a quick response (QR) code including information representing that the failure occurs in the equipment corresponding to the collected sound data, a cause of the failure of the equipment, information on an estimated failure position among components of the equipment, and a countermeasure for the cause of the failure of the equipment and control a communication unit so that the communication unit transmits the generated QR code to a terminal corresponding to a phone number of a manager prestored in a storage unit.

The controller may perform data classification for training by categorizing a plurality of pieces of previously collected equipment-specific sound data by type, convert the plurality of pieces of classified equipment-specific sound data into spectrogram images, and then perform a training function for the failure diagnosis and failure cause determination model using the plurality of pieces of converted equipment-specific spectrogram images as training data.

Another aspect of the present invention provides a method of diagnosing an equipment failure using a sound spectrogram image, the method including collecting, by a sensor unit, sound data and collection position information of the sound data from one side of equipment, converting, by a controller, the collected sound data into a spectrogram image, and performing, by the controller, machine learning on the basis of the converted spectrogram image, a type of equipment, and the collected collection position information of the sound data and determining whether a failure occurs in the equipment related to the collected sound data on the basis of a machine learning result.

The determining of whether a failure occurs in the equipment related to the collected sound data may include performing machine learning using the converted spectrogram image, the type of equipment, and the collected collection position information of the sound data as input values of a preset failure diagnosis and failure cause determination model and determining whether a failure occurs in the equipment related to the collected sound data on the basis of a machine learning result.

The method may further include, when it is determined that no failure occurs in the equipment related to the collected sound data, performing, by the controller, control to display information representing that no failure occurs in the equipment corresponding to the collected sound data through a display unit.

The method may further include, when it is determined that a failure occurs in the equipment related to the collected sound data, classifying, by the controller, a cause of the failure, searching for, by the controller, a countermeasure for the classified cause of the failure of the equipment among countermeasures prestored in a storage unit for causes of equipment failures, and performing, by the controller, control to display information representing that the failure occurs in the equipment corresponding to the collected sound data, the cause of the failure of the equipment, information on an estimated failure position among components of the equipment, and a countermeasure for the cause of the failure of the equipment through a display unit.

The method may further include generating, by the controller, a QR code including the information representing that the failure occurs in the equipment corresponding to the collected sound data, the cause of the failure of the equipment, the information on the estimated failure position among the components of the equipment, and the countermeasure for the cause of the failure of the equipment, and controlling a communication unit so that the communication unit transmits the generated QR code to a terminal corresponding to a phone number of a manager prestored in the storage unit.

Advantageous Effects

According to the present invention, sound data is collected through a sensor unit provided at one side of equipment and converted into a spectrogram image, and machine learning is performed using the converted spectrogram image as an input value to determine whether a failure occurs in the equipment and classify the cause of the failure. Accordingly, whether a failure occurs in equipment is rapidly and accurately determined, and when it is determined that a failure occurs in the equipment, the cause of the failure is rapidly identified, and a countermeasure therefor can be provided.

BEST MODE OF THE INVENTION

Terminology used in this invention is used only for describing specific embodiments and is not intended to limit the present invention. Unless otherwise defined in the present invention, technical terms used herein have the same meaning as generally understood by those skilled in the technical field to which the present invention pertains, and should not be interpreted in an overly inclusive sense or an excessively narrow sense. When a technical term used herein is an incorrect technical term that does not accurately express the spirit of the present invention, it should be understood as a technical term that may be properly understood by those skilled in the art. General terms used herein should be interpreted as defined in dictionaries or in the context and should not be interpreted in an excessively narrow sense.

As used herein, singular expressions include plural expressions as well unless the context clearly indicates otherwise. In the present invention, the terms "comprise," "include," "have," and the like should not be interpreted as necessarily including all components or operations described herein. It is to be understood that some of the components or operations may not be included, or additional components or operations may be further included.

Terms including ordinal numbers, such as "first," "second," and the like, used herein may be used for describing components, but the components are not limited by the terms. The terms are only used for the purpose of distinguishing one component from another. For example, a first component may be named a second component without departing from the scope of the present invention, and a second component may likewise be named a first component.

Hereinafter, exemplary embodiments of the present invention will be described in detail with reference to the accompanying drawings. Throughout the drawings, like reference numerals will be given to like components, and duplicate descriptions thereof will be omitted.

In describing the present invention, when it is determined that the detailed description of known relevant technology may obscure the subject matter of the present invention, the detailed description will be omitted. It is to be noted that the accompanying drawings are intended only to facilitate understanding of the spirit of the present invention and should not be construed as limiting the spirit of the present invention.

Figure 1:
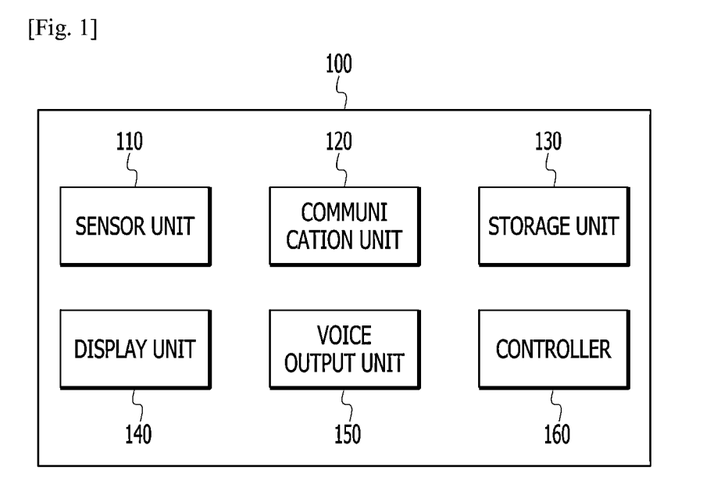
FIG. 1 is a block diagram showing a configuration of an apparatus for diagnosing an equipment failure using a sound spectrogram image according to an embodiment of the present invention.

FIG. 1 is a block diagram showing a configuration of an apparatus 100 for diagnosing an equipment failure using a sound spectrogram image according to an embodiment of the present invention.

As shown in FIG. 1, the apparatus 100 for diagnosing an equipment failure using a sound spectrogram image includes a sensor unit 110, a communication unit 120, a storage unit 130, a display unit 140, a voice output unit 150, and a controller 160. Not all the components of the apparatus 100 for diagnosing an equipment failure shown in FIG. 1 are essential components. The apparatus 100 for diagnosing an equipment failure may be implemented by more or fewer components than those shown in FIG. 1.

The apparatus 100 for diagnosing an equipment failure may be applied to various terminals such as a smartphone, a portable terminal, a mobile terminal, a foldable terminal, a personal digital assistant (PDA), a portable multimedia player (PMP) terminal, a telematics terminal, a navigation terminal, a personal computer (PC), a laptop computer, a slate PC, a tablet PC, an Ultrabook, a wearable device (e.g., a smartwatch, smart glasses, a head-mounted display (HMD), and the like), a wireless broadband (WiBro) terminal, an Internet protocol television (IPTV) terminal, a smart TV, a digital broadcast terminal, an audio video navigation (AVN) terminal, an audio/video (A/V) system, a flexible terminal, a digital signage device, and the like.

The sensor unit 110 includes various sensors, a microphone, and the like for collecting (or measuring) sound data.

A magnet may be formed on one side of the sensor unit 110 to facilitate attachment or detachment of the device (or equipment) for collecting sound data, or a ring may be formed to surround a portion of the device.

As described above, a fixing gear (or fixing unit) (not shown) that is detachable from the corresponding gear may be provided (or formed) on one side of the sensor unit 110 to facilitate the collection of sound data.

The sensor unit 100 collects (or measures/detects) sound data from one side of equipment. In this case, the sensor unit 110 may collect information on a position (e.g., a component in the equipment or the like) at which the sound data is collected (or collection position information of the sound data). Here, the equipment is a pump, a motor, a ventilator, a refrigerator (or a refrigerant circulation pump), an air conditioner, or the like.

In embodiments of the present invention, it is described that sound data is collected through the sensor unit 110, but the present invention is not limited thereto. The apparatus 100 for diagnosing an equipment failure may receive (or collect) sound data collected from one side of any equipment from a sensor gear (not shown) which is externally provided.

The communication unit 120 performs communication with any internal component or at least one external terminal through a wired/wireless communication network. Here, the external terminal may be a sensor gear (not shown), a server (not shown), a terminal (not shown), or the like. Wireless Internet technology includes a wireless local area network (WLAN), Digital Living Network Alliance (DLNA), WiBro, World Interoperability for Microwave Access (WiMAX), high speed downlink packet access (HSDPA), high speed uplink packet access (HSUPA), Institute of Electrical and Electronics Engineers (IEEE) 802.16, Long Term Evolution (LTE), LTE-Advanced (LTE-A), wireless mobile broadband service (WMBS), and the like. The communication unit 120 transmits and receives data according to at least one of wireless Internet technologies even including those not listed above. Also, short-communication technology may include Bluetooth, radio frequency identification (RFID), infrared data association (IrDA), ultra-wideband (UWB), ZigBee, near field communication (NFC), ultra-sound communication (USC), visible light communication (VLC), Wi-Fi, Wi-Fi direct, and the like. In addition, wired communication technology may include power line communication (PLC), Universal Serial Bus (USB) communication, Ethernet, serial communication, an optical/coaxial cable, and the like.

The communication unit 120 and a terminal may transmit information to each other through USB.

The communication unit 120 transmits and receives wireless signals to and from a base station, the sensor gear, the server, the terminal, and the like in a mobile communication network built according to technical standards or communication methods for mobile communication (e.g., Global System for Mobile Communications (GSM), code division multi-access (CDMA), CDMA2000, enhanced voice-data optimized or enhanced voice-data only (EV-DO), wideband CDMA (WCDMA), HSDPA, HSUPA, LTE, LTE-A, and the like).

Under the control of the controller 160, the communication unit 120 transmits the collected sound data and the like to the server, the terminal, and the like or receives the sound data and the like transmitted from the sensor gear and the like.

The storage unit 130 stores various user interfaces (UIs), graphical user interfaces (GUIs), and the like.

Also, the storage unit 130 stores data, programs, and the like required for operations of the apparatus 100 for diagnosing an equipment failure using a sound spectrogram image.

In other words, the storage unit 130 may store multiple application programs (or applications) executed in the apparatus 100 for diagnosing an equipment failure and data and instructions for operations of the apparatus 100 for diagnosing an equipment failure. At least some of the application programs may be downloaded from an external server through wireless communication. Also, at least some of the application programs may have existed in the apparatus 100 for diagnosing an equipment failure since the time of release for basic functionality of the apparatus 100 for diagnosing an equipment failure. Meanwhile, the application programs may be stored in the storage unit 130, installed in the apparatus 100 for diagnosing an equipment failure, and run by the controller 160 to perform operations (functions) of the apparatus 100 for diagnosing an equipment failure.

The storage unit 130 may include at least one storage medium among a flash memory type, a hard disk type, a multimedia card micro type, a card type memory (e.g., a secure digital (SD) or extreme digital (XD) memory or the like), a magnetic memory, a magnetic disk, an optical disc, a random access memory (RAM), a static RAM (SRAM), a read-only memory (ROM), an electrically erasable programmable ROM (EEPROM), and a programmable ROM (PROM). The apparatus 100 for diagnosing an equipment failure may run a web storage that performs a storage function of the storage unit 130 on the Internet, or operate in connection with the web storage.

In addition, the storage unit 130 stores the collected sound data and the like under the control of the controller 160.

The display unit 140 may display various content, such as various menu screens and the like, using the UIs and/or GUIs stored in the storage unit 130 under the control of the controller 160. Here, the content displayed in the display unit 140 includes menu screens and the like which include various text or image data (including various information data), an icon, a list menu, a combo box, and the like. The display unit 140 may be a touchscreen.

Also, the display unit 140 may include at least one of a liquid crystal display (LCD), a thin film transistor (TFT)-LCD, an organic light-emitting diode (OLED) display, a flexible display, a three-dimensional (3D) display, an e-ink display, and a light-emitting diode (LED) display.

The display unit 140 displays information on the collected sound data and the like under the control of the controller 160.

The voice output unit 150 outputs voice information include in a signal that is subjected to certain signal processing by the controller 160. Here, the voice output unit 140 may include a receiver, a speaker, a buzzer, and the like.

Also, the voice output unit 150 outputs an announcement voice generated by the controller 160.

In addition, the voice output unit 150 outputs the collected sound data and the like under the control of the controller 160.

The controller or microcontroller unit (MCU) 160 performs overall control functions of the apparatus 100 for diagnosing an equipment failure using a sound spectrogram image.

The controller 160 performs the overall control functions of the apparatus 100 for diagnosing an equipment failure using the programs and data stored in the storage unit 130. The controller 160 may include a RAM, a ROM, a central processing unit (CPU), a graphics processing unit (GPU), and a bus, and the RAM, the ROM, the CPU, the GPU, and the like may be connected through the bus. The CPU may access the storage unit 130, perform booting using an operating system (OS) stored in the storage unit 130, and perform various operations using various programs, content, data, and the like stored in the storage unit 130.

The controller 160 categorizes a plurality of pieces of equipment-specific sound data by type and performs data classification for training (including, for example, a normal sound, a shaft failure sound, a bearing damage sound, a cavitation sound, an impeller failure sound, a motor bearing sound, and the like).

The controller 160 converts the plurality of pieces of classified equipment-specific sound data into spectrogram images and then uses the plurality of converted equipment-specific spectrogram images as data for continuous machine learning (or deep learning). As input datasets for the machine learning, the plurality of converted equipment-specific spectrogram images may be divided into a train set and a test set at a preset ratio (e.g., 7:3) so that train and test functions may be performed. Also, the input datasets for the machine learning include spectrogram images and the like obtained by converting equipment-specific sound data which is collected later. Output datasets for the machine learning are data to be predicted. Collected sound data is learned, and output datasets, which include whether there is a failure, the cause of a failure, and the like, are predicted later.

In other words, the controller 160 performs a training function on a failure diagnosis and failure cause determination model using preset training data to classify (or check/determine) whether a failure is diagnosed from a specific spectrogram image, a judgment of the cause of a failure, and the like. Here, the server 200 may store raw data (including training data and the like) in parallel in a distributed manner, refine unstructured data, structured data, and semi-structured data included in the raw data (including training data and the like), perform preprocessing which includes classification into metadata, perform analysis including data mining on the preprocessed data, and perform learning, training, and testing on the basis of at least one type of machine learning to build big data. Here, the at least one type of machine learning may be any one or at least one combination of supervised learning, semi-supervised learning, unsupervised learning, reinforcement learning, and deep reinforcement learning.

The controller 160 performs a learning function for classifying (or checking/determining) a failure diagnosis, a judgment of the cause of a failure, and the like from a specific spectrogram image in connection with specific raw data on the failure diagnosis and failure cause determination model using the training data.

As described above, the controller 160 performs a learning function on the failure diagnosis and failure cause determination model, which is in the form of a neural network, using the training data and the like.

The controller 160 converts the sound data collected through the sensor unit 110 into a spectrogram image. A spectrogram is a tool (or method) for visualizing and understanding sound or waves, in which features of a waveform and a spectrum are combined. While the waveform shows a change on an amplitude axis according to a change on a time axis, and the spectrum shows a change on the amplitude axis according to a change on a frequency axis. On the other hand, the spectrogram shows an amplitude difference using a difference in print density and/or a difference in displayed color according to a change on the time axis and the frequency axis.

The controller 160 performs machine learning on the basis of the converted spectrogram image and a type of equipment and determines (or checks) whether a failure occurs in the equipment related to the sound data on the basis of the machine learning result. Here, the controller 160 may perform machine learning on the basis of the converted spectrogram image, the type of equipment, the collection position information of the collected sound data, and the like and determine whether a failure occurs in the equipment related to the sound data on the basis of the machine learning result.

In other words, the controller 160 performs machine learning (or artificial intelligence/deep learning) using the converted spectrogram image, the type of equipment, the collection position information of the collected sound data, and the like as input values of the failure diagnosis and failure cause determination model and determines (or checks/classifies) whether a failure occurs in the equipment on the basis of the machine learning result (or the artificial intelligence result/deep learning result) in connection with the spectrogram image (or the sound data).

When it is determined (or checked) that no failure occurs in the equipment (or the equipment related to the collected sound data), the controller 160 outputs information representing that no failure occurs in the equipment corresponding to the collected sound data through the display unit 140 and/or the voice output unit 150.

When it is determined (or checked) that a failure occurs in the equipment (or the equipment related to the collected sound data), the controller 160 classifies (or checks/judges/determines) the cause of the failure (e.g., a shaft failure, bearing damage, cavitation, an impeller failure, a motor bearing failure, or the like) on the basis of the machine learning result.

As described above, the controller may collect sound data related to the equipment and classify the cause of a failure through machine learning on the basis of the collected sound data (or a spectrogram image obtained by converting the sound data).

Also, the controller 160 searches (or checks) for a countermeasure for the classified (or checked/judged/determined) cause of the failure of the equipment among countermeasures prestored in the storage unit 130 for the causes of equipment failures.

The controller 160 outputs information representing that a failure occurs in the corresponding equipment, the cause of the failure of the equipment, information on an estimated failure position among components of the equipment, the found (or checked) countermeasure for the cause of the failure of the equipment, and the like through the display unit 140 and/or the voice output unit 150. The information on the estimated failure position among the components of the equipment may be the collection position information of the sound data which corresponds to the position at which the sound data of the equipment diagnosed with the failure is measured.

The controller 160 generates a quick response (QR) code including the information representing that a failure occurs in the corresponding, the cause of the failure of the equipment, the information on the estimated failure position among the components of the equipment, the found (or checked) countermeasure for the cause of the failure of the equipment, and the like and transmits the generated QR code to a terminal (not shown) corresponding to a phone number or email of a manager prestored in the storage unit 130 through the communication unit 120.

The terminal carried by the manager receives the QR code transmitted through the communication unit 120 and displays the information included in the received QR code thereon according to a selection of the manager so that the manager can easily check whether the equipment managed by the manager is abnormal (or has a failure), the cause of the failure, the countermeasure, and the like.

The controller 160 may subscribe to the server as a member to perform various functions provided by the apparatus 100 for diagnosing an equipment failure.

To perform the various functions, the controller 160 may perform a function of paying a certain amount of money on a monthly (or daily/weekly/quarterly/yearly or the like) basis in conjunction with the server and a payment server (not shown) when a subscription function is performed.

According to embodiments of the present invention, the apparatus 100 for diagnosing an equipment failure using a sound spectrogram image may perform various functions (e.g., a sound data collection function, a function of converting a spectrogram image of sound data, a machine learning function based on a spectrogram image, a type of equipment, and information on a position at which sound data is measured, a function of providing information about whether a failure occurs in equipment and/or the cause of an equipment failure, and the like) in the form of an exclusive application or website.

As described above, sound data may be collected through a sensor unit provided at one side of equipment and converted into a spectrogram image, and machine learning may be performed using the converted spectrogram image as an input value to determine whether a failure occurs in the equipment and classify the cause of the failure.

A method of diagnosing an equipment failure using a sound spectrogram image according to the present invention will be described in detail below with reference to FIGS. 1 to 3.

Figure 2:
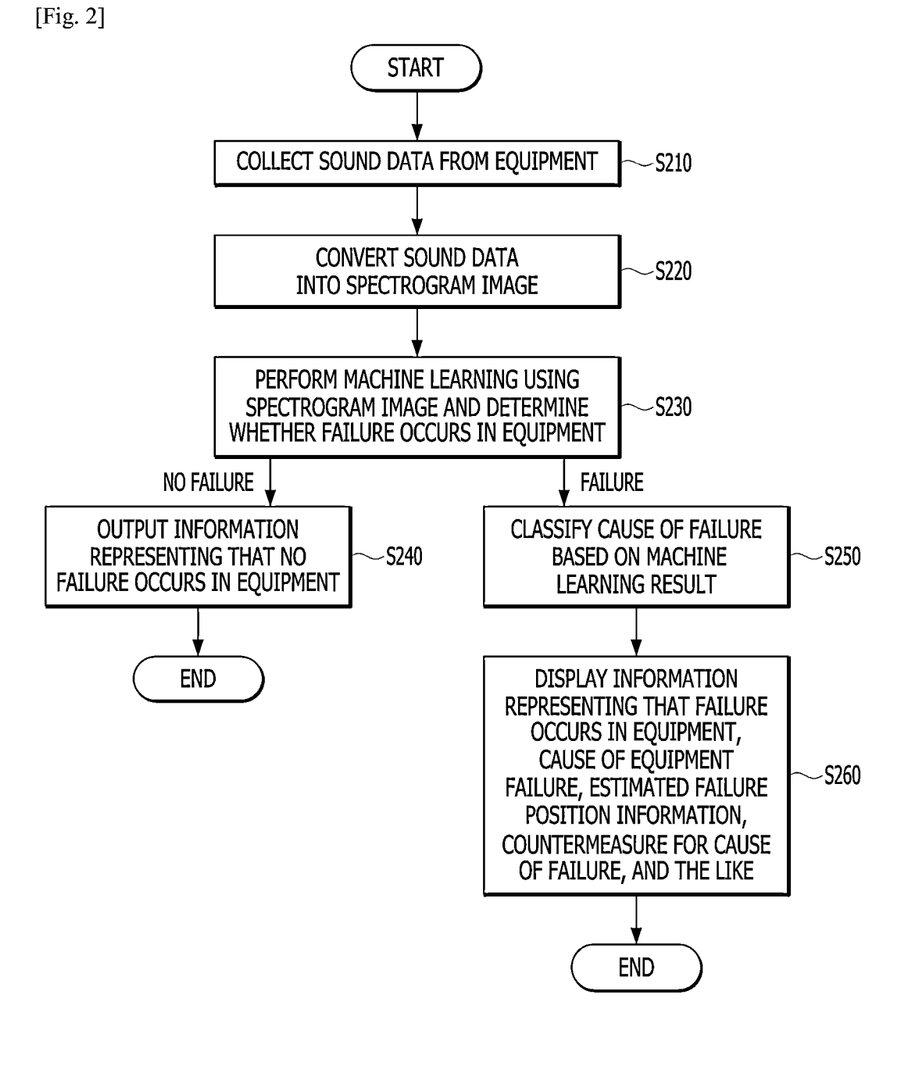
FIG. 2 is a flowchart illustrating a method of diagnosing an equipment failure using a sound spectrogram image according to an embodiment of the present invention.

FIG. 2 is a flowchart illustrating a method of diagnosing an equipment failure using a sound spectrogram image according to an embodiment of the present invention.

First, the sensor unit 110 collects sound data from one side of equipment. Here, the sensor unit 110 may also collect information on a position (e.g., a component in the equipment or the like) at which the sound data is collected (or collection position information of the sound data). Here, the equipment is a pump, a motor, a ventilator, a refrigerator (or a refrigerant circulation pump), an air conditioner, or the like. Also, the sensor unit 110 includes various sensors, a microphone, and the like for collecting (or measuring) the sound data.

Figure 3:
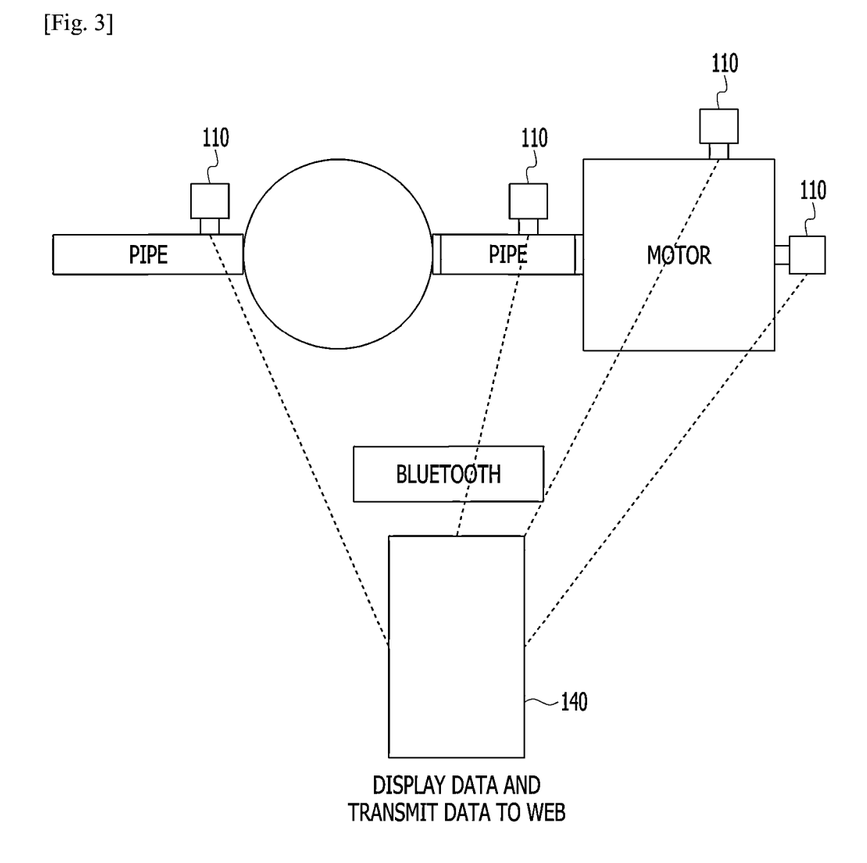
FIG. 3 is a diagram showing an example of a sound data collection process according to an embodiment of the present invention.

For example, as shown in FIG. 3, a first sensor unit 110 collects first sound data from one side of a first pipe connected to a pump in first equipment, which includes a plurality of pipes, the pump, a motor, and the like, a second sensor unit 110 collects second sound data from one side of a second pipe connecting the pump and the motor, and a third sensor unit and a fourth sensor unit 110 collect third sound data and fourth sound data from different sides of the motor, respectively (S210).

Subsequently, the controller 160 converts the collected sound data into spectrogram images. A spectrogram is a tool (or method) for visualizing and understanding sound or waves, in which features of a waveform and a spectrum are combined. While the waveform shows a change on an amplitude axis according to a change on a time axis, and the spectrum shows a change on the amplitude axis according to a change on a frequency axis. On the other hand, the spectrogram shows an amplitude difference using a difference in print density and/or a difference in displayed color according to a change on the time axis and the frequency axis.

For example, the controller 160 converts the collected first to fourth sound data into first to fourth spectrogram images, respectively (S220).

Subsequently, the controller 160 performs machine learning on the basis of the converted spectrogram image and the type of equipment and determines (or checks) whether a failure occurs in the equipment related to the sound data on the basis of the machine learning result. Here, the controller 160 may perform machine learning on the basis of the converted spectrogram image, the type of equipment, the collection position information of the collected sound data, and the like and determine whether a failure occurs in the equipment related to the sound data on the basis of the machine learning result.

In other words, the controller 160 performs machine learning (or artificial intelligence/deep learning) using the converted spectrogram image, the type of equipment, the collection position information of the collected sound data, and the like as input values of a preset failure diagnosis and failure cause determination model and determines (or checks/classifies) whether a failure occurs in the equipment on the basis of the machine learning result (or the artificial intelligence result/deep learning result) in connection with the spectrogram image (or the sound data).

For example, the controller 160 performs machine learning using the converted first to fourth spectrogram images, the type of first equipment, first collection position information of the first sound data (e.g., one side of the first pipe connected to the pipe), second collection position information of the second sound data (e.g., one side of the second pipe connecting the pump and the motor), third collection position information of the third sound data (e.g., one side of the motor), fourth collection position information of the fourth sound data (e.g., another side of the motor) as input values of the failure diagnosis and failure cause determination model and determines whether a failure occurs in the components of the first equipment corresponding to the first to fourth collection position information on the basis of the machine learning result in connection with the first to fourth spectrogram images (S230).

When it is determined (or checked) that no failure occurs in the equipment, the controller 160 outputs information representing that no failure occurs in the equipment corresponding to the collected sound data to the display unit 140 and/or the voice output unit 150.

For example, when it is determined on the basis of the machine learning result that no failure occurs in any of the components of the first equipment corresponding to the first to fourth collection position information in connection with the first to fourth spectrogram images, the controller 160 outputs information representing that no failure occurs in the first equipment corresponding to the collected first to fourth sound data through the display unit 140 and/or the voice output unit 150 (S240).

When it is determined (or checked) that a failure occurs in the equipment, the controller 160 classifies (or checks/judges/determines) the cause of the failure (e.g., a shaft failure, bearing damage, cavitation, an impeller failure, a motor bearing failure, or the like) on the basis of the machine learning result.

For example, when it is determined on the basis of the machine learning result that a failure occurs in the component of the equipment corresponding to the second spectrogram image in connection with the first to fourth spectrogram images, the controller 160 classifies the cause of the failure (e.g., bearing damage) on the basis of a second machine learning result about the second spectrogram image from which it is determined on the basis of the machine learning result that a failure occurs in the component (S250).

Subsequently, the controller 160 searches (or checks) for a countermeasure for the classified (or checked/judged/determined) cause of the failure of the equipment among countermeasures prestored in the storage unit 130 for the causes of equipment failures.

Also, the controller 160 outputs information representing that a failure occurs in the corresponding equipment, the cause of the failure of the equipment, information on an estimated failure position among components of the equipment, the found (or checked) countermeasure for the cause of the failure of the equipment, and the like through the display unit 140 and/or the voice output unit 150.

In addition, the controller 160 generates a QR code including the information representing that a failure occurs in the corresponding equipment, the cause of the failure of the equipment, the information on the estimated failure position among the components of the equipment, the found (or checked) countermeasure for the cause of the failure of the equipment, and the like and transmits the generated QR code to a terminal (not shown) corresponding to a phone number or email of a manager prestored in the storage unit 130 through the communication unit 120.

The terminal carried by the manager receives the QR code transmitted through the communication unit 120 and displays the information included in the received QR code thereon according to a selection of the manager so that the manager can easily check whether the equipment managed by the manager is abnormal (or has a failure), the cause of the failure, the countermeasure, and the like.

For example, the controller 160 searches for a first countermeasure (e.g., when a bearing connecting the pump and the motor is damaged, the pump or motor may be damaged due to the broken bearing, and it is necessary to temporarily stop operation of the equipment and then replace the bearing) for the classified cause of the failure (e.g., bearing damage) among countermeasures prestored in the storage unit 130 for the causes of equipment failures.

Also, the controller 160 outputs the information representing that a failure occurs in the corresponding equipment, the cause of the failure of the equipment (e.g., bearing damage), the information on the estimated failure position in the equipment, the found first countermeasure (e.g., when a bearing connecting the pump and the motor is damaged, the pump or motor may be damaged due to the broken bearing, and it is necessary to temporarily stop operation of the equipment and then replace the bearing), and the like through the display unit 140 and/or the voice output unit 150 (S260).

As described above, according to embodiments of the present invention, sound data is collected through a sensor unit provided at one side of equipment and converted into a spectrogram image, and machine learning is performed using the converted spectrogram image as an input value to determine whether a failure occurs in the equipment and classify the cause of the failure. Accordingly, whether a failure occurs in equipment is rapidly and accurately determined, and when it is determined that a failure occurs in the equipment, the cause of the failure is rapidly identified, and a countermeasure therefor can be provided.

The above description can be modified and altered by those skilled in the technical field to which the present invention pertains without departing from the essential characteristics of the present invention. Therefore, the embodiments disclosed in the present invention are intended not to limit but to describe the technical spirit of the present invention, and the scope of the technical spirit of the present invention is not limited by the embodiments. The scope of the present invention should be interpreted on the basis of the following claims, and all technical spirits within a range equivalent thereto should be construed as falling within the scope of the present invention.

MODES OF THE INVENTION

Modes of the invention have been described above together with the best mode of the invention.

INDUSTRIAL APPLICABILITY

According to the present invention, sound data is collected through a sensor unit provided at one side of equipment and converted into a spectrogram image, and machine learning is performed using the converted spectrogram image as an input value to determine whether a failure occurs in the equipment and classify the cause of the failure. Therefore, whether a failure occurs in equipment is rapidly and accurately determined, and when it is determined that a failure occurs in the equipment, the cause of the failure is rapidly identified, and a countermeasure therefor can be provided, which leads to industrial applicability.

The invention claimed is:

1. An apparatus for diagnosing an equipment failure using a sound spectrogram image, the apparatus comprising:
   a sensor unit having a fixing gear including a magnet or ring detachable from an equipment, and configured to collect sound data and collection position information of the sound data from one side of the equipment; and
   a controller configured to convert the collected sound data into a spectrogram image, perform machine learning based on the converted spectrogram image, a type of the equipment, and the collected collection position information of the sound data, and determine whether a failure occurs in the equipment related to the collected sound data based on a machine learning result,
   wherein the controller performs data classification for training by classifying each of a plurality of pieces of previously collected equipment-specific sound data into any one type of normal sound, shaft failure sound, bearing damage sound, cavitation sound, impeller failure sound, and motor bearing sound, converts the plurality of pieces of classified equipment-specific sound data into spectrogram images, divides the plurality of converted equipment-specific spectrogram images into a train set and a test set, and then performs a training and test function for a preset failure diagnosis and failure cause determination model using the divided train set and test set,
   the controller performs machine learning using the converted spectrogram image, the type of the equipment, and the collected collection position information of the sound data as input values of the failure diagnosis and failure cause determination model and determines whether the failure occurs in the equipment related to the collected sound data based on a machine learning result, and
   when it is determined that the failure occurs in the equipment related to the collected sound data, the controller classifies a cause of the failure as any one of a shaft failure, bearing damage, cavitation, an impeller failure, and a motor bearing failure based on the machine learning result.

2. The apparatus of claim 1, wherein, when it is determined that the failure occurs in the equipment related to the collected sound data, the controller classifies a cause of the failure, searches for a countermeasure for a classified cause of the equipment failure among countermeasures prestored in a storage unit for causes of the equipment failure, and performs control to display information representing that the failure occurs in the equipment corresponding to the collected sound data, the cause of the failure of the equipment, information on an estimated failure position among components of the equipment, and a countermeasure for the cause of the failure of the equipment through a display unit.

3. The apparatus of claim 1, wherein the controller generates a quick response (QR) code including information representing that the failure occurs in the equipment corresponding to the collected sound data, a cause of the failure of the equipment, information on an estimated failure position among components of the equipment, and a countermeasure for the cause of the failure of the equipment and controls a communication unit so that the communication unit transmits the generated QR code to a terminal corresponding to a phone number of a manager prestored in a storage unit.

4. A method of diagnosing an equipment failure using a sound spectrogram image, the method comprising:
classifying, by a controller, each of a plurality of pieces of previously collected equipment-specific sound data into any one type of normal sound, shaft failure sound, bearing damage sound, cavitation sound, impeller failure sound, and motor bearing sound to perform data classification for training;
converting, by the controller, the plurality of pieces of classified equipment-specific sound data into spectrogram images and dividing the plurality of converted equipment-specific spectrogram images into a train set and a test set at a preset ratio;
performing, by the controller, a training and test function for a preset failure diagnosis and failure cause determination model using the divided train set and test set;
collecting, by a sensor unit, sound data and collection position information of the sound data from one side of an equipment;
converting, by the controller, the collected sound data into a spectrogram image;
performing, by the controller, machine learning based on the converted spectrogram image, a type of the equipment, and the collected collection position information of the sound data and determining whether a failure occurs in the equipment related to the collected sound data based on a machine learning result; and
when it is determined that the failure occurs in the equipment related to the collected sound data, classifying, by the controller, a cause of the failure as any one of a shaft failure, bearing damage, cavitation, an impeller failure, and a motor bearing failure based on the machine learning result,
wherein the sensor unit has a fixing gear including a magnet or ring detachable from the equipment, and
the determining of whether the failure occurs in the equipment related to the collected sound data comprises performing machine learning using the converted spectrogram image, the type of the equipment, and the collected collection position information of the sound data as input values of the failure diagnosis and failure cause determination model, and determining whether the failure occurs in the equipment related to the collected sound data based on a machine learning result.

5. The method of claim 4, further comprising, when it is determined that no failure occurs in the equipment related to the collected sound data, performing, by the controller, control to display information representing that no failure occurs in the equipment corresponding to the collected sound data through a display unit.

6. The method of claim 4, further comprising:
when it is determined that the failure occurs in the equipment related to the collected sound data, classifying, by the controller, the cause of the failure;
searching for, by the controller, a countermeasure for a classified cause of the failure of the equipment among countermeasures prestored in a storage unit for causes of the equipment failure; and
performing, by the controller, control to display information representing that the failure occurs in the equipment corresponding to the collected sound data, the cause of the failure of the equipment, information on an estimated failure position among components of the equipment, and a countermeasure for the cause of the failure of the equipment through a display unit.

7. The method of claim 4, further comprising:
generating, by the controller, a quick response (QR) code including information representing that the failure occurs in the equipment corresponding to the collected sound data, the cause of the failure of the equipment, the information on an estimated failure position among components of the equipment, and a countermeasure for the cause of the failure of the equipment; and
controlling a communication unit so that the communication unit transmits the generated QR code to a terminal corresponding to a phone number of a manager prestored in a storage unit.

* * * * *